US010315638B2

(12) United States Patent
Dekam

(10) Patent No.: US 10,315,638 B2
(45) Date of Patent: Jun. 11, 2019

(54) AIR BRAKING SYSTEM

(71) Applicant: Robert Lambertus Dekam, Langley (CA)

(72) Inventor: Robert Lambertus Dekam, Langley (CA)

( * ) Notice: Subject to any disclaimer, the term of this patent is extended or adjusted under 35 U.S.C. 154(b) by 78 days.

(21) Appl. No.: 15/204,955

(22) Filed: Jul. 7, 2016

(65) Prior Publication Data

US 2018/0009427 A1 Jan. 11, 2018

(51) Int. Cl.
 *B60T 13/38* (2006.01)
 *B60T 15/52* (2006.01)

(52) U.S. Cl.
 CPC ............ *B60T 15/52* (2013.01); *B60T 13/38* (2013.01)

(58) Field of Classification Search
 CPC .............................. B60T 15/52; B60T 13/406
 See application file for complete search history.

(56) References Cited

U.S. PATENT DOCUMENTS

| | | | |
|---|---|---|---|
| 2,723,164 A | 11/1955 | Burdick | |
| 2,800,980 A * | 7/1957 | Flockhart | B60T 13/403 137/102 |
| 3,163,255 A | 12/1964 | Stryker | |
| 3,359,869 A * | 12/1967 | Avrea | B60T 13/263 188/1.11 R |
| 3,947,072 A * | 3/1976 | Plantan | B60T 13/263 303/13 |
| 4,003,605 A * | 1/1977 | Fannin | B60T 13/261 303/13 |
| 4,007,021 A | 2/1977 | Gyllinder | |
| 4,017,125 A | 4/1977 | Durling | |
| 4,261,624 A * | 4/1981 | Plantan | B60T 8/26 303/40 |
| 4,453,780 A | 6/1984 | Neal | |

(Continued)

FOREIGN PATENT DOCUMENTS

| | | |
|---|---|---|
| CA | 2351218 A1 | 12/2002 |
| CN | 1663859 A | 9/2005 |

(Continued)

OTHER PUBLICATIONS

International Search Report and Written Opinion, dated Aug. 24, 2017, for corresponding International Application No. PCT/IB2017/052988.

(Continued)

*Primary Examiner* — Bradley T King
*Assistant Examiner* — Mahbubur Rashid
(74) *Attorney, Agent, or Firm* — Black, McCuskey, Souers & Arbaugh LPA

(57) ABSTRACT

An air braking system for a vehicle can include an air compressor, a reservoir, a first air line, a brake hub, a second air line, a control valve, a release valve, and a third fluid line. The first line can place an outlet of the compressor in fluid communication with an inlet of the reservoir. The brake hub can have a chamber in fluid communication with the outlet of the reservoir via the second line. The control valve can selectively open and close the second air line. The release valve can be in fluid communication with the chamber and having an outlet. The third line can place the outlet of the release valve in fluid communication with an inlet of the compressor.

15 Claims, 2 Drawing Sheets

(56) References Cited

U.S. PATENT DOCUMENTS

| | | | |
|---|---|---|---|
| 4,707,166 | A | 11/1987 | Khosropour |
| 5,046,786 | A | 9/1991 | Johnston et al. |
| 5,205,315 | A | 4/1993 | Margerum |
| 5,286,095 | A | 2/1994 | Sell et al. |
| 5,425,572 | A | 6/1995 | Koelzer et al. |
| 5,558,408 | A | 9/1996 | Naedler et al. |
| 6,206,481 | B1 | 3/2001 | Isers et al. |
| 6,234,586 | B1 | 5/2001 | Davis et al. |
| 6,267,135 | B1 | 7/2001 | Ho |
| 6,293,102 | B1 | 9/2001 | Stay et al. |
| 6,425,935 | B1 | 7/2002 | Amato et al. |
| 6,655,750 | B2 | 12/2003 | Soupal |
| 6,743,277 | B2 | 6/2004 | Goodell et al. |
| 6,785,980 | B1 | 9/2004 | Koelzer |
| 7,942,427 | B2 | 5/2011 | Lloyd |
| 8,006,801 | B2 | 8/2011 | Christoffers et al. |
| 2004/0012249 | A1* | 1/2004 | Koelzer ............ B60G 17/0523 303/3 |
| 2006/0232125 | A1* | 10/2006 | Thomas ................ B60T 13/38 303/7 |
| 2008/0050250 | A1* | 2/2008 | Bockelman ............ B60T 17/02 417/298 |
| 2010/0183452 | A1 | 7/2010 | Bosua |
| 2012/0221223 | A1* | 8/2012 | Schaffeld ............... F02B 33/38 701/102 |
| 2013/0276899 | A1* | 10/2013 | Frank ................... F15B 21/044 137/1 |
| 2014/0251437 | A1* | 9/2014 | Raye ..................... B60T 17/04 137/1 |
| 2016/0068149 | A1* | 3/2016 | Jordan .................. B60T 15/52 303/69 |

FOREIGN PATENT DOCUMENTS

| | | | |
|---|---|---|---|
| CN | 201566598 U | 9/2010 | |
| CN | 201891544 U | 7/2011 | |
| CN | 102434241 A | 5/2012 | |
| CN | 102069788 A | 11/2012 | |
| CN | 103121445 A | 5/2013 | |
| CN | 203449913 U | 2/2014 | |
| CN | 203819055 U | 9/2014 | |
| CN | 104709265 A | 6/2015 | |
| CN | 204895453 U | 12/2015 | |
| DE | 69819933 T2 | 4/2004 | |
| DE | 202006010655 U1 | 11/2006 | |
| EP | 0199949 A2 | 11/1986 | |
| EP | 2266854 B1 | 5/2013 | |
| GB | 613303 A * | 11/1948 | ............ B60T 13/36 |
| JP | 0565724 U | 8/1993 | |
| JP | 5201267 A | 8/1993 | |
| JP | 06312651 U | 11/1994 | |

OTHER PUBLICATIONS

Name of Author unknown; Title: "Bottling System Air Recovery at NPE 2009"; webpage: https://www.airbestpractices.com/technology/air-compressors/bottling-system-air-recovery-npe-2009; Date: earliest capture at Wayback Machine is Mar. 1, 2010.

Name of Author unknown; No title; webpage: http://earsnorthamerica.com/home.html; Date: earliest capture at Wayback Machine is Mar. 16, 2007.

* cited by examiner

AIR BRAKING SYSTEM

BACKGROUND

1. Field

The present disclosure relates to a vehicle braking system and more particularly to a pneumatic brake system for trucks which include quick release valves which expel pressurized air when the vehicle is put in park.

2. Description of Related Prior Art

U.S. Pat. No. 5,425,572 discloses a quick-release valve for a vehicle air release brake system. A simplified and less-costly quick-release valve with controlled hysteresis for a vehicle spring-set air-release parking brake system lengthens the operating life of the valve, reduces energy consumption, extends compressor life and alleviates noise problems. The valve comprises a valve body and a plurality of internal passageways each of which is selectively connectable to at least another of the passageways. The selective connection is controlled by an integrally-formed flexural spring-brake-control release diaphragm within the valve body and disposed to either isolate or selectively connect the passageways depending on the relative pressure conditions within the passageways and respective areas of the diaphragm exposed to the pressures. The components are designed so that the normal variations or cycling of the supply or intake pressurized air does not cause cycling of the pressure in the spring-brake chambers.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An air braking system for a vehicle can include an air compressor, a reservoir, a first air line, at least one brake hub, a second air line, a control valve, at least one release valve and a third fluid line. The air compressor can have an inlet and an outlet. The reservoir can have an inlet and an outlet. The first air line can place the outlet of the compressor in fluid communication with the inlet of the reservoir. The at least one brake hub can have a chamber. The second air line can place the chamber in fluid communication with the outlet of the reservoir. The control valve can be operably disposed along the second air line to selectively open and close the second air line. The at least one release valve can be in fluid communication with the chamber and having an outlet. The third air line can place the outlet of the at least one release valve in fluid communication with the inlet of the compressor.

BRIEF DESCRIPTION OF THE DRAWINGS

The detailed description set forth below references the following drawings.

DETAILED DESCRIPTION

The present disclosure, as demonstrated by the exemplary embodiments described below, can drastically reduce noise as it eliminates the emission of pressurized air to atmosphere. It is mandatory to release air in conventional truck air braking systems in order to engage the brakes every time a vehicle with air brakes stops. However, noise control is becoming more a prominent environmental issue. Trucks often stop and park near residences.

The exemplary embodiment can also create closed loop of air, eliminating the waste of filtered and dried air. The air expelled by the system's release valve has already gone through the air dryer and had moisture removed from compression. This air can be re-used so maintenance and compressor wear is less. Also, an air purge from the air dryer and other expansion tanks in the system that collect moisture would be less taxed.

The exemplary embodiment can also allow air to be stored at a lower pressure since air moves to the expansion tank from the higher pressure brake spring hold chamber. This allows at least some compressors to be more efficient as it is drawing air that is still higher than atmosphere giving it slightly better efficiency.

Embodiments of the present disclosure can be adapted to all existing air brake systems which is a massive market, such as rigs, delivery trucks, and busses.

Figure 1:
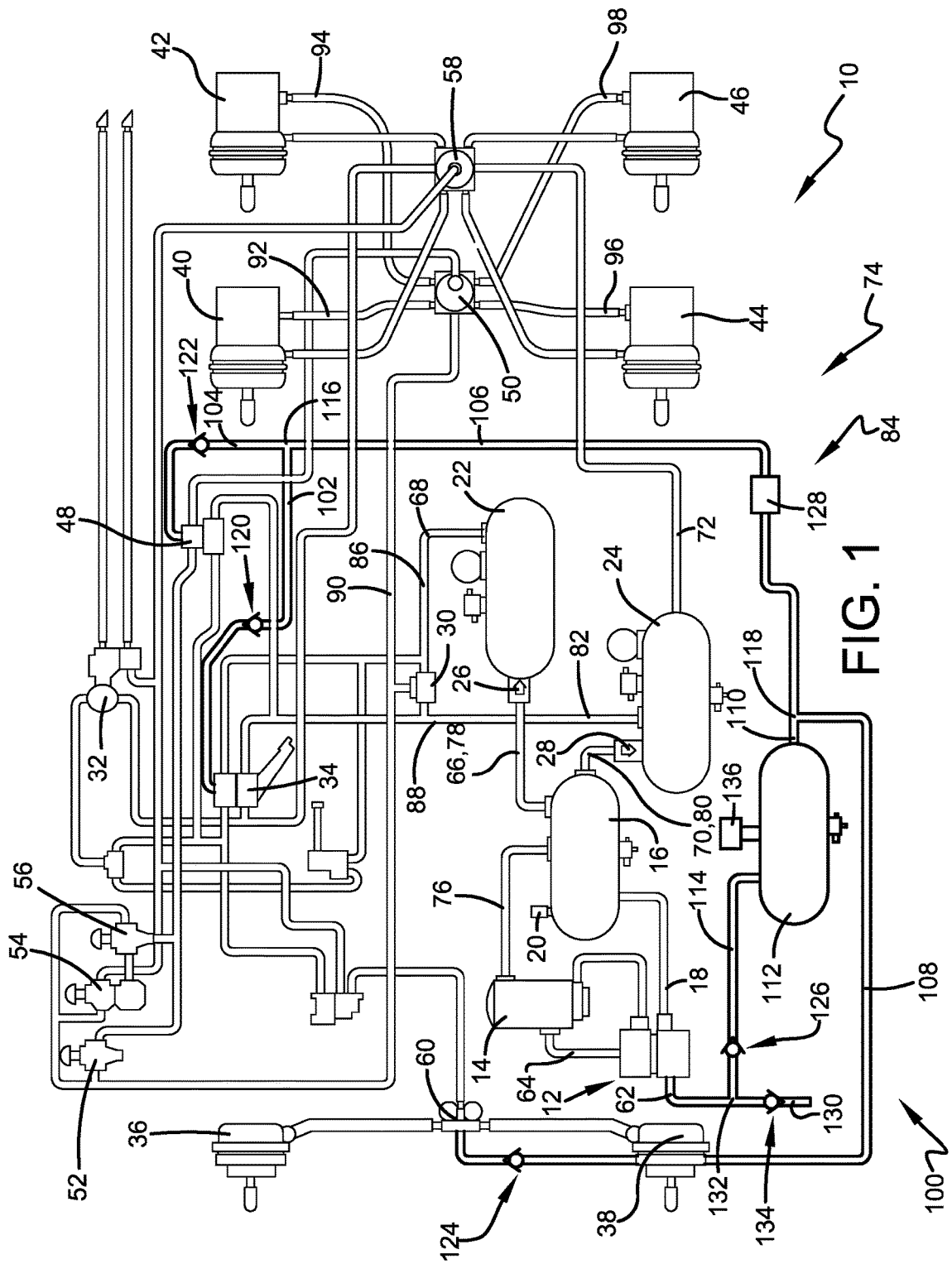
FIG. 1 is a schematic air braking system incorporating an exemplary embodiment of the present disclosure.

FIG. 1 shows an exemplary embodiment of an air braking system 10 for a vehicle. The system 10 can include an air compressor 12. The compressor 12 can have an inlet 62 and an outlet 64. The compressor 12 can build up air pressure and directs air an air-dryer 14 on to a reservoir 16. A governor 18 on the compressor 12 can keep air pressure between one hundred and one hundred and twenty pounds per square inch (PSI). A safety valve 20 on the reservoir 16 can prevent the air pressure from exceeding one hundred and fifty pounds PSI. The reservoir 16 feeds reservoirs 22, 24, each having a check valve 26, 28 preventing air flow back to the reservoir 16. The reservoir 22 can have an inlet 66 and an outlet 68. The reservoir 24 can have an inlet 70 and an outlet 72. The reservoir 22 can be utilized for the front axle of the vehicle and the reservoir 24 can be utilized for the rear axle(s).

A double check valve 30 and a double check and brake light switch valve 32 selectively permit supply air pressure from both or either of the reservoirs 22, 24. If either reservoir 22, 24 suffers a drop in air pressure, then that reservoir is isolated from the other. Further, only the pressurized reservoir provides air to the shared valves 30, 32. The double check and brake light switch valve 32 activates with pressure from either reservoir 22, 24.

The brake pedal value or treadle valve 34 is two independent service brake valves in one. One portion of the treadle valve 34 selectively permits air pressure to the front axle. Another portion of the treadle valve 34 selectively permits air pressure to the rear axles. Both portions regulate the air pressure (PSI) in response to pedal movement. Increased pedal movement results in increased air pressure to the associated axles.

FIG. 1 shows a plurality of brake hubs and each brake hub is positioned at a wheel of the vehicle. The exemplary system includes brake hubs 36, 38 at the front axle and brake hubs 40, 42, 44, 46 at the rear axle. Each of the brake hubs 36-46 defines an internal chamber operable to receive pressurized air. The exemplary rear brake hubs 40-46 can include multiple chambers, such as first chamber to selectively apply braking during operation and a second chamber to apply braking when the vehicle is parked. A spring brake can be positioned in the second chamber. When the vehicle is operating, air pressure in the second chamber biases the spring brake out of the engaged position. When the vehicle is parked, a release valve in the form of a spring brake release valve 48 (or merely spring brake valve) can allow the air pressure in the second chamber to evacuate, causing the spring brake to move to the engaged position and inhibit movement of the wheel. Exemplary release valves include Bendix® models QRV™ and QR-1™.

In the exemplary embodiment, pressurized air for the second chambers of the rear brake hubs 40-46 can be supplied by both reservoirs 22, 24 through the valve 30. The system 10 includes piping such that pressurized air can travel from the valve 30 to an anti-compounding parking brake relay valve 50 and also to parking brake control valves 52, 54, 56 that can be positioned in the cab of the vehicle. The valve 52 is utilized to control the parking brake portions of the brake hubs 40-46. When the valve 52 is activated, pressurized air is no longer being communicated to the anti-compounding parking brake relay valve 50 and this causes air in the second chambers of the rear brake hubs 40-46 to be purged through the valve 48. Further, the parking/spring brakes become engaged. When the valve 52 is deactivated, pressurized air is being communicated to the anti-compounding parking brake relay valve 50 and the valve 48 will be closed. Further, the parking/spring brakes will not become engaged. It is noted that if air pressure has been lost in the reservoir 24, the valve 48 will not permit the purging of pressurized air from the second chambers of the rear brake hubs 40-46.

The valve 54 is utilized to control the parking brake portions of a trailer attached to the vehicle. The valve 56 is another, optional valve that is utilized to control the parking brake portions of a trailer attached to the vehicle.

The anti-compounding parking brake relay valve 50 permits the flow of pressurized air from the valve 30 into the second chambers of the rear brake hubs 40-46. The anti-compounding parking brake relay valve 50 is responsive to the air pressure received through the valves 52 and 48. When pressurized air is not present in the air line from the valves 52 and 58, the valve 50 closes (and the valve 48 opens) and blocks air flow between the valve 30 and the second chambers of the rear brake hubs 40-46. When pressurized air is present in the air line from the valves 52 and 58, the valve 50 opens (and the valve 48 is closed) and permits air flow between the valve 30 and the second chambers of the rear brake hubs 40-46.

Air for the service brake portions of the rear brake hubs 40-46 is communicated through the treadle valve 34. The treadle valve 34 selectively communicates pressurized air to a control port of a bobtail proportional relay valve 58. The bobtail proportional relay valve 58 permits the flow of pressurized from the reservoir 24 into the first chambers of the rear brake hubs 40-46 (the service brake chambers). The bobtail proportional relay valve 58 is responsive to the air pressure received through the treadle valve 34. When pressurized air is not present in the air line from the treadle valve 34, the valve 58 closes and blocks air flow between the reservoir 24 and the first chambers of the rear brake hubs 40-46. When pressurized air is present in the air line from the treadle valve 34, the valve 58 opens and permits air flow between the reservoir 24 and the first chambers of the rear brake hubs 40-46. When braking is released by the driver, air can evacuate the first chambers through the anti-compounding parking brake relay valve 50.

The exemplary treadle valve 34 and remainder of the system 10 are configured such that, if air pressure has been lost in the reservoir 24, the valve 48 can be operable to direct air back to the treadle valve 34 and the valve 48 can exhaust air from the second chambers of the rear brake hubs 40-46 when the brake pedal is pressed.

Pressurized air is delivered to the front brake hubs 36, 38 from the reservoir 22. Passage of this pressurized air is controlled with the treadle valve 34. When braking is released by the driver, air can evacuate the front brake hubs 36, 38 through a quick release valve 60.

The exemplary air braking system 10 can also include a first air line 74. The first air line 74 can place the outlet 64 of the compressor 12 in fluid communication with the inlets 66, 70 of the reservoirs 22, 24. It is noted that the term "air line" is used herein to indicated path placing two structures in fluid communication with one another. An air line can be defined by a plurality of structures interconnected with one another. The exemplary first air line 74 is defined by multiple components, including the air-dryer 14, a piping member 76, the reservoir 16, and one or both of piping members 78, 80.

The exemplary air braking system 10 can also include a second air line 84. The exemplary second air line 84 can place the second chambers of the rear brakes 40-46 in fluid communication with outlets 68, 82 of the reservoirs 22, 24. It is noted that in the exemplary embodiment, two reservoirs (22 and 24) are utilized to provide pressurized air to the second chambers of the rear brakes 40-46, but a single reservoir could be utilized in other embodiments of the present disclosure. The exemplary second air line 84 is defined by multiple components, including piping members 86, 88, valve 30, piping member 90, the anti-compounding parking brake relay valve 50, and piping members 92, 94, 96, 98. The exemplary anti-compounding parking brake relay valve 50 thus defines a control valve operably disposed along the second air line 84 to selectively open and close the second air line 84.

The exemplary system 10 includes at least one release valve in fluid communication with the chamber and each has an outlet. Each of the valves 34, 48 and 60 defines a release valve. These release valves are operable to allow air to be purged from the second chambers of the rear brakes 40-46.

The exemplary air braking system 10 also includes third air line 100. The third air line 100 can place the outlet of the release valve(s) in fluid communication with the inlet 62 of the compressor 12. The exemplary third air line 100 places the outlets of the valves 34, 48 and 60 in fluid communication with the inlet 62. The exemplary third air line 100 is defined by multiple components, including piping members 102, 104, 106, 108, 110, reservoir 112, and piping member 114. The exemplary piping member 102 extends from the outlet of the valve 34. The exemplary piping member 104 extends from the outlet of the valve 48. The exemplary piping members 102, 104 can merge at a t-fitting 116. The exemplary piping member 106 extends from the t-fitting 116. The exemplary piping member 108 extends from the outlet of the valve 60. The exemplary piping members 106, 108 can merge at a t-fitting 118. The exemplary piping member 110 extends from the t-fitting 120 and extends to the reservoir 112. The exemplary piping member 114 extends from the reservoir 112 to the inlet 62.

Thus, a first branch (piping member 102) of the third air line 100 extends from a first valve 34 of the plurality of release valves. A second branch (piping member 104) of the third air line 100 extends from a second valve 48 of the plurality of release valves. A third branch (piping member 108) of the third air line 100 extends from a third valve 60 of the plurality of release valves. The branches merge upstream of the inlet 62 of the compressor 12.

The air braking system 10 can also include a plurality of check valves positioned along the third air line 100. Each of the plurality of check valves can be individually disposed along one of the first branch and the second branch and the third branch. Check valves are referenced in FIG. 1 at 120, 122, and 124. The air braking system 10 can also include a safety blow-off port 128 disposed along the third air line 100 upstream of the inlet of the compressor 12. The air braking system 10 can also include a safety valve 136 that allows air out of the reservoir 112 if the air pressure in the reservoir 112 exceeds some predetermined amount that would prevent purging of air from the second chambers of the brake hubs 40-46. The air braking system 10 can also include a pressure reducing valve 126 to ensure the air pressure in the third air line 100 is less than any predefined maximum intake pressure of the inlet 62.

The air braking system 10 also includes an atmospheric air intake line 130 in fluid communication with the inlet 62 of the compressor 12. The intake line 130 merges with the piping member 114 at a t-fitting 132. The intake line 130 is thus disposed at least partially in parallel to the third air line 100 and intersects the third air line 100 at a junction upstream of the inlet 62 of the compressor 12. A check valve 134 can be disposed along the atmospheric air intake line 130 upstream of the junction.

Figure 2:
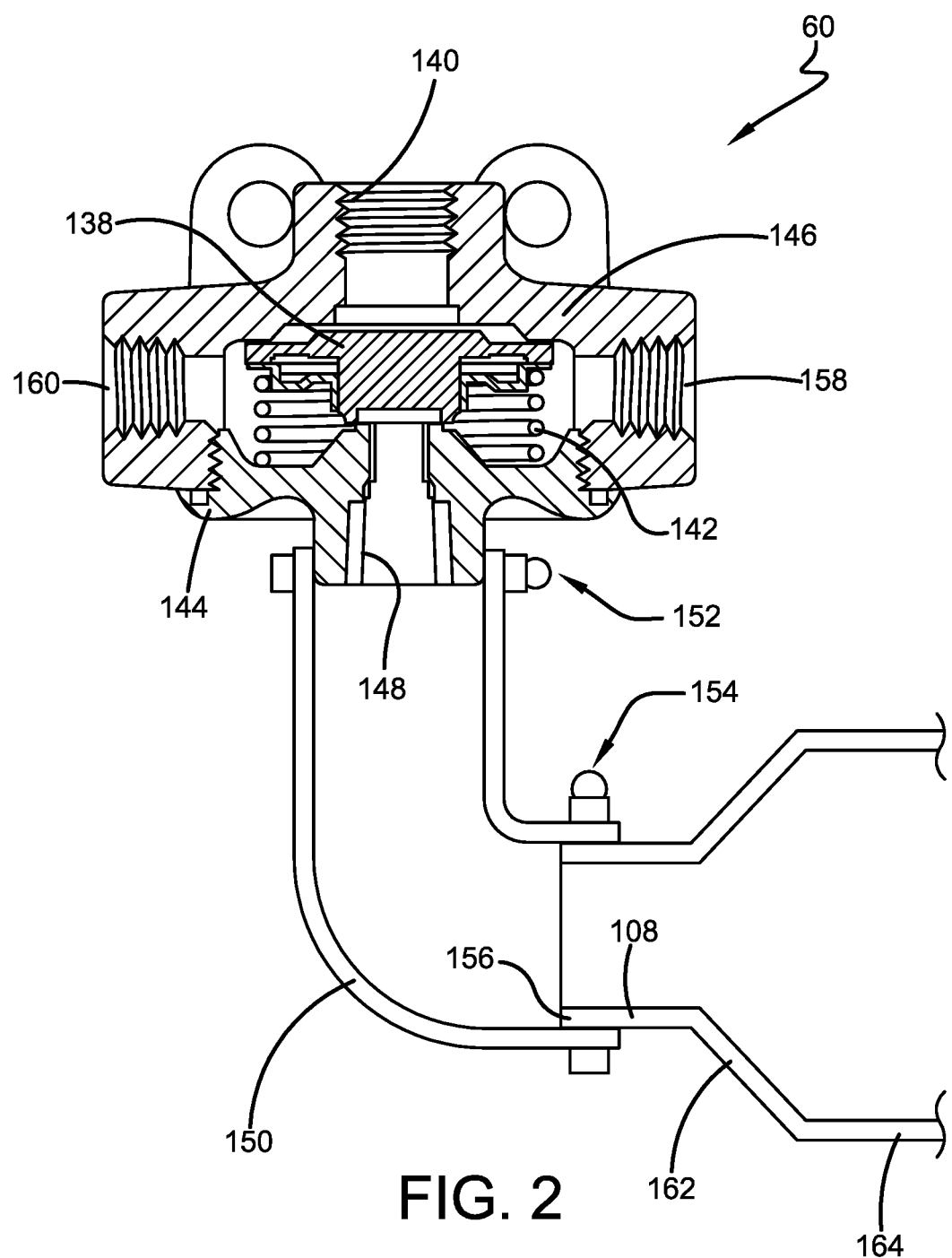
FIG. 2 is a cross-sectional view of a portion of another exemplary embodiment of the present disclosure.

The third air line 100 can define an interior volume greater than a volume of the second chambers of the brake hubs 40-46. The exemplary third air line 100 defines an interior volume greater than twice the combined volumes of the second chambers of the brake hubs 40-46. In the exemplary embodiment shown in FIG. 1 the expansion of volume is ensured by the inclusion of the reservoir 112. The reservoir 112 is sized in view of the size of the second chambers. A portion of an alternative embodiment is shown in FIG. 2. An alternative embodiment of the present disclosure can include a third air line that is formed exclusively with piping components. "Formed exclusively with piping components" refers to a third air line that does not include a reservoir, only sections of pipe (piping members), t-fittings, elbows, etc. Such a third air line can include an expansion section wherein an interior diameter of the third air line increases in a direction of air flow. The diameter of the piping components of the third air line can be greater than the diameter of piping components of the braking circuit; this is represented in FIG. 1 by thicker lines. The diameter of the piping components of the third air line can be twice the diameter of piping components of the braking circuit.

In FIG. 2, the valve 60 is shown including a diaphragm 138. Pressurized air is received from the reservoir 22 at an inlet 140. When pressurized air is received at the inlet 140, the diaphragm 138 is urged open against a biasing spring 142. The diaphragm 138 is urged against a cover 144 of the valve 60. Pressurized air then passes to the front brake hubs 36, 38 through ports 158, 160. When pressurized air is not received at the inlet 140, the diaphragm 138 is urged closed by the biasing spring 142. The diaphragm 138 is urged against a body 146 of the valve 60 and away from the cover 144. Pressurized air is then permitted to pass under the diaphragm 138 from the front brake hubs 36, 38 and into the outlet 148 of the valve 60. In this embodiment, the third air line can include a boot 150 disposed between the valve 60 and the piping member 108. Clamps 152 and 154 can position the boot 150 in place. The piping member 108 can include an initial section 156 of a first diameter and also include an expansion section 162 wherein the interior diameter of the third air line increases in a direction of air flow. The piping member 108 can expand to a section 164 having a constant diameter greater than the diameter of the section 156. Piping members having enlarged sections, such as section 164, can be directed through the frame of the vehicle and other areas of unused space of the vehicle.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or subcombinations that are disclosed herein as other present disclosures in other patent documents is hereby unconditionally reserved.

What is claimed is:

1. An air braking system for a vehicle comprising:
    an air compressor having an inlet and an outlet;
    a reservoir having an inlet and an outlet;
    a first air line placing said outlet of said compressor in fluid communication with said inlet of said reservoir;
    at least one brake hub having a chamber;
    a second air line placing said chamber in fluid communication with said outlet of said reservoir whereby pressurized fluid enters said chamber through said second air line;
    a control valve operably disposed along said second air line to selectively open and close said second air line;
    at least one release valve in fluid communication with said chamber and having an outlet, said at least one release valve configured to selectively open and purge pressurized fluid from said chamber;
    a third air line placing said outlet of said at least one release valve in fluid communication with said inlet of said compressor; and
    wherein said third air line further comprises a piping component defining an expansion section that is proximate to said at least one release valve, wherein an interior diameter of said piping component of said third air line increases in a direction of purged air flow and said diameter is greater than a diameter of said second air line through which pressurized air enters said chamber, whereby the purged air can expand in said third air line before passing to said inlet of said compressor.

2. The air braking system of claim 1 wherein said at least one release valve is further defined as a quick release valve.

3. The air braking system of claim 1 wherein said at least one release valve is further defined as a spring brake valve.

4. The air braking system of claim 1 wherein said at least one release valve is further defined as a treadle valve.

5. The air braking system of claim 1 wherein said at least one release valve is further defined as a plurality of release valves.

6. The air braking system of claim 5 wherein said third air line further comprises:
    a first branch extending from a first of said plurality of release valves;
    a second branch extending from a second of said plurality of release valves; and a third branch extending from a third of said plurality of release valves, wherein said first branch and said second branch and said third branch merge upstream of said inlet of said compressor and wherein each of said first branch and said second branch and said third branch is positioned between said inlet of said compressor and said chamber of said brake hub relative to the flow of fluid through said chamber of said brake hub and into said inlet of said compressor.

7. The air braking system of claim 6 further comprising:
a plurality of check valves, each individually disposed along one of said first branch and said second branch and said third branch.

8. The air braking system of claim 1 further comprising:
a second reservoir positioned along said third air line upstream of said inlet of said compressor; and
a safety valve communicating with said second reservoir that allows air out of said second reservoir if the air pressure in said second reservoir exceeds a predetermined amount that would prevent purging of air from the second chambers.

9. The air braking system of claim 8 further comprising:
a safety blow-off port disposed along said third air line upstream of said inlet of said compressor, wherein an open fluid flow path extends between said safety blow-off port and said safety valve.

10. The air braking system of claim 1 further comprising:
an atmospheric air intake line in fluid communication with said inlet of said compressor disposed at least partially in parallel to said third air line and intersecting said third air line at a junction upstream of said inlet of said compressor, both of said atmospheric air intake line and said third air line directing fluid only to said inlet of said compressor.

11. The air braking system of claim 10 further comprising:
a check valve disposed along said atmospheric air intake line upstream of said junction.

12. The air braking system of claim 1 wherein said third air line defines an interior volume greater than a volume of said chamber, whereby the pressurized fluid in said chamber is received in said third air line when said at least one release valve opens.

13. The air braking system of claim 1 wherein said third air line defines an interior volume greater than twice a volume of said chamber, whereby the pressurized fluid in said chamber is received in said third air line when said at least one release valve opens.

14. The air braking system of claim 1 wherein said third air line is further defined as formed exclusively with piping components.

15. The air braking system of claim 1 wherein said chamber of said brake hub is positioned between said third air line and said second air line relative to the flow of fluid through said chamber of said brake hub.

* * * * *